(12) United States Patent
Neuman

(10) Patent No.: US 6,481,680 B2
(45) Date of Patent: Nov. 19, 2002

(54) TABLE HOOK WITH MOVABLE SUPPORT FOR PURSES AND THE LIKE

(75) Inventor: David T. Neuman, New York, NY (US)

(73) Assignee: P.K. Torten Enterprises, New York, NY (US)

( * ) Notice: Subject to any disclaimer, the term of this patent is extended or adjusted under 35 U.S.C. 154(b) by 0 days.

(21) Appl. No.: 09/904,484

(22) Filed: Jul. 13, 2001

(65) Prior Publication Data

US 2002/0074469 A1 Jun. 20, 2002

Related U.S. Application Data

(63) Continuation-in-part of application No. 09/740,647, filed on Dec. 19, 2000.

(51) Int. Cl.[7] .............................. A47F 5/08; F16B 45/00
(52) U.S. Cl. .................... 248/227.2; 248/308; 248/215; 248/914; 248/231.81
(58) Field of Search ................................. 248/308, 304, 248/307, 301, 914, 227.1, 227.2, 229.26, 225.21, 231.21, 231.81, 231.85, 215

(56) References Cited

U.S. PATENT DOCUMENTS

| | | | |
|---|---|---|---|
| 2,473,086 A | 6/1949 | Montero | 248/308 |
| 2,516,760 A | 7/1950 | Doran | 248/229 |
| 2,521,037 A | 9/1950 | Brinton | 248/215 |
| 2,532,255 A | 11/1950 | Davis | 248/215 |
| 2,565,719 A * | 8/1951 | Church | 248/215 |
| 2,631,803 A | 3/1953 | Meyers | 248/215 |
| 3,240,463 A | 3/1966 | Cook | 248/339 |
| 3,321,166 A | 5/1967 | Gordon | 248/206 |
| 3,376,006 A | 4/1968 | Zezula | 248/227 |
| 3,599,916 A * | 8/1971 | Szabo | 248/73 |
| 3,767,152 A | 10/1973 | Killinger | 248/226 |
| 3,773,288 A | 11/1973 | Bolton | 248/226 |
| 3,860,210 A | 1/1975 | Berardinelli et al. | 248/308 |
| 4,194,714 A * | 3/1980 | Schultz | 248/308 |
| 4,210,302 A | 7/1980 | Serkez | 248/308 |
| 4,312,455 A * | 1/1982 | Weber | 211/119.005 |
| 4,477,046 A * | 10/1984 | Repp | 248/95 |
| 4,728,069 A * | 3/1988 | Semcer | 248/227.2 |
| 4,978,093 A | 12/1990 | Kennedy | 248/205 |
| D314,864 S | 2/1991 | Creed | D3/54 |
| 5,000,418 A | 3/1991 | Vogt | 248/689 |
| 5,082,225 A * | 1/1992 | Nespoli | 248/231.81 |
| 5,094,417 A | 3/1992 | Creed | 248/215 |
| 5,458,301 A | 10/1995 | Cournoyer | 248/95 |
| 5,594,419 A | 1/1997 | Lo | 340/568 |
| D384,505 S | 10/1997 | Stewart | D3/328 |
| 5,794,312 A * | 8/1998 | O'Mahony | 24/3.3 |

* cited by examiner

*Primary Examiner*—Anita King
(74) *Attorney, Agent, or Firm*—Darby & Darby

(57) ABSTRACT

An assembly for suspending a purse or bag from a table edge. The assembly includes a mechanism for anchoring itself to the table edge when is positioned about the table edge. The assembly distributes the weight of the purse or bag to primary support elements. A hook depends downwardly from a bracket to support a bag or purse. The hook includes an element positioned within the opening of the bracket to transfer at least some of the weight of the bag or purse to the bracket. A rivet co-joins the bracket and anchoring mechanism together.

20 Claims, 3 Drawing Sheets

FIG. 3
FIG. 4
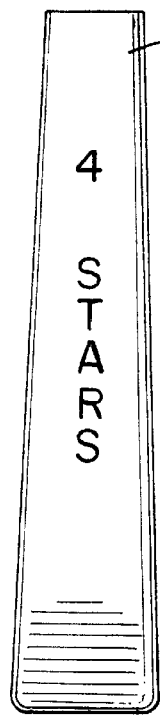
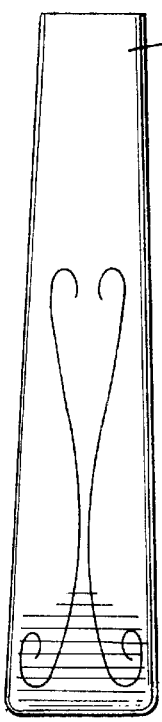
FIG. 5
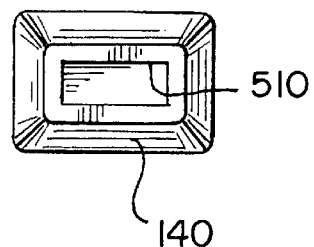
FIG. 6
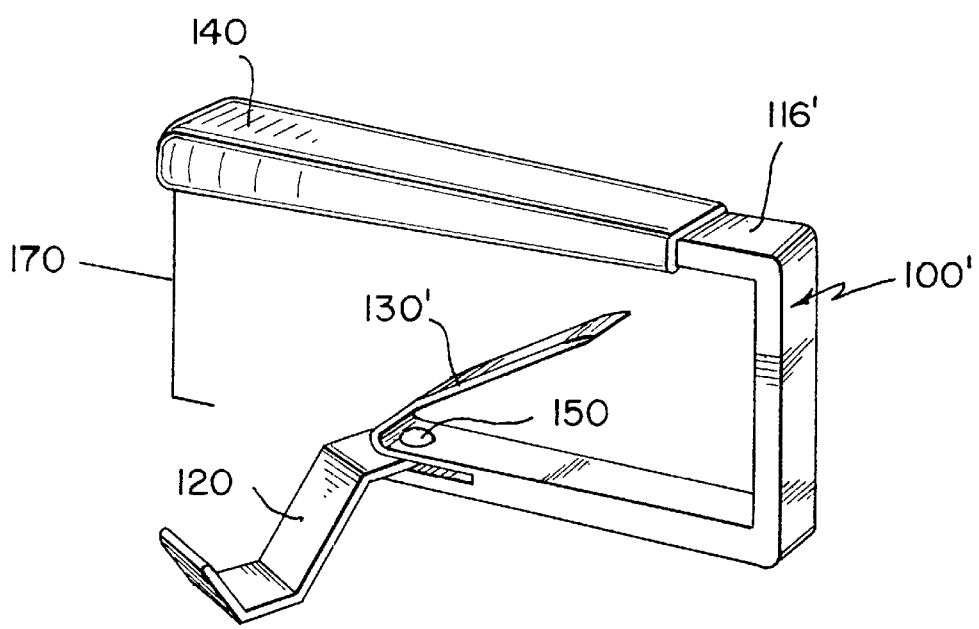

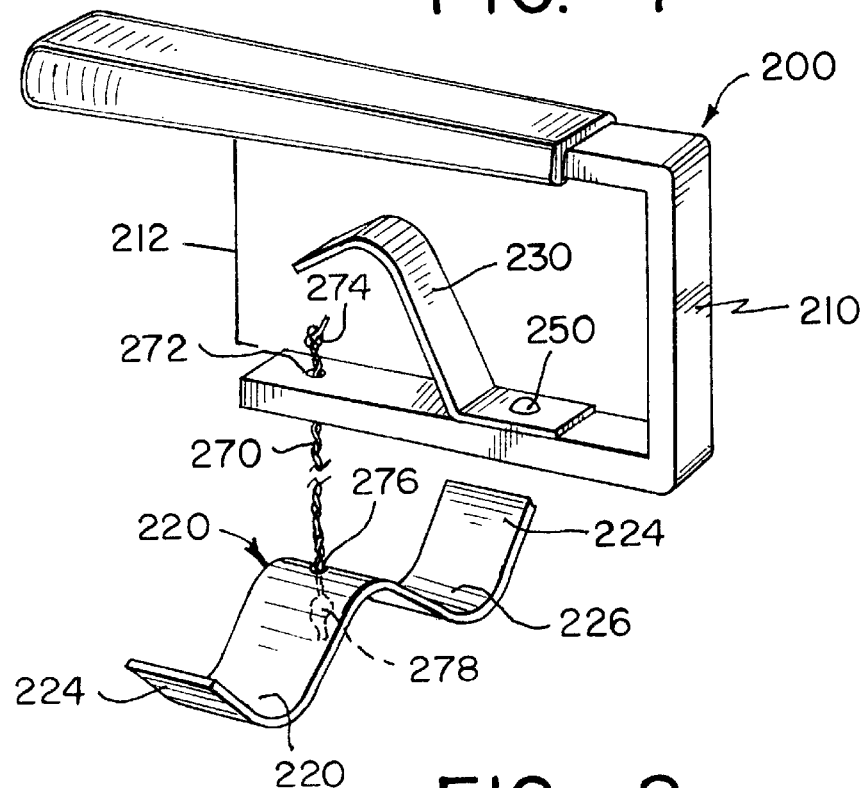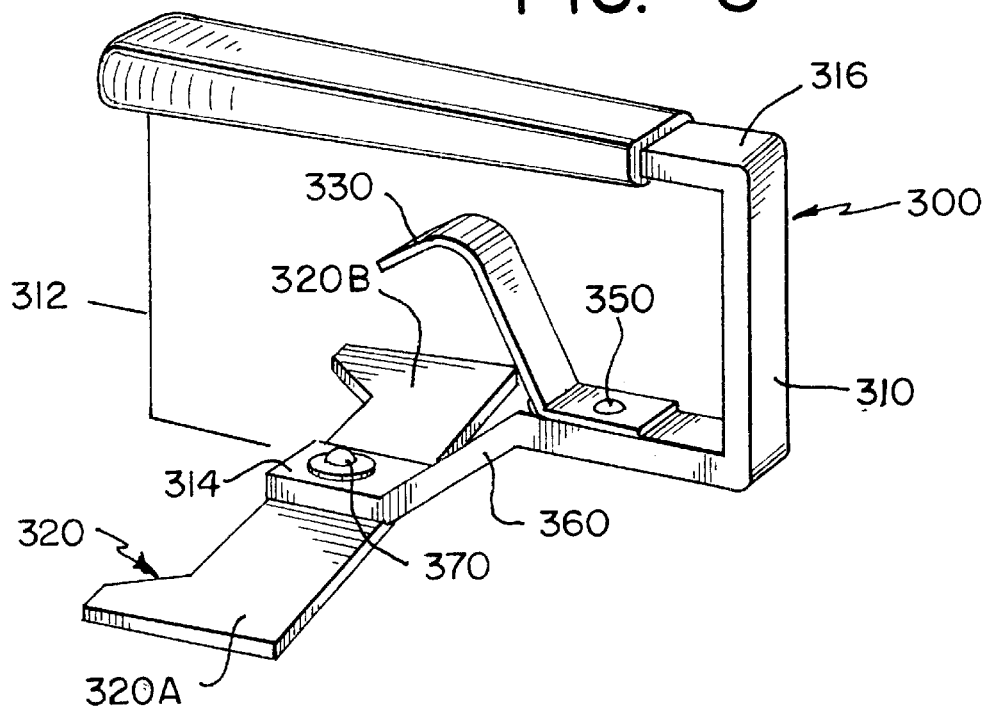

TABLE HOOK WITH MOVABLE SUPPORT FOR PURSES AND THE LIKE

CROSS-REFERENCE TO RELATED CASES

This application is a continuation-in-part of U.S. patent application Ser. No. 09/740,647, filed Dec. 19, 2000, entitled "Table Hook for Purses and the Like," which is hereby incorporated by reference as if set forth in its entirety herein.

FIELD OF THE INVENTION

The present invention relates to improvements in devices for receiving, hanging and supporting purses, handbags, other bags and the like from the edge of a table.

BACKGROUND OF THE INVENTION

Several devices are known in the literature for supporting handbags, purses and the like from the edge of a table. Such devices provide benefits in restaurants, for example, by enabling the owner to position such belongings close at hand, yet not on the table surface or on the floor. Many benefits result, including maintaining space on the table, preventing soiling of or damage to the handbag, etc., and minimizing the risk that the bag will be misplaced, forgotten, or stolen.

A number of such devices are described in the patent literature. The closest reference known to Applicant is U.S. Pat. No. 5,094,417 of inventor Creed. The '417 patent describes a handbag support for the edge of a table which includes a C-shaped bracket 25 and a downwardly depending hook 41 which rotates about a rivet 42. The device of the '417 patent lacks any element to anchor the bracket to a table edge. Instead, the device freely hangs from the table edge. Also, the device of the '417 uses the rivet 42 to support all of the weight of the bag and its contents.

What remains needed in the art is an improved adaptable support for handbags and the like which overcomes the limitations of prior art designs. The present invention provides such an improvement.

SUMMARY OF THE INVENTION

The present invention is an assembly for suspending a purse or bag from a table edge. The assembly of the present invention can include a mechanism for automatically anchoring itself to the table edge as it is moved into a mounting position. In addition, the inventive assembly is constructed so as to distribute the weight of the purse or bag to primary support elements.

In a preferred configuration, the assembly comprises a generally C-shaped bracket having an opening with a leaf spring disposed within the opening of the bracket and arranged to flex into that opening in response to an external force applied by the table edge. The leaf spring constitutes the preferred anchoring mechanism for anchoring the assembly to the table edge.

The assembly further comprises a hook which depends downwardly from the bracket which has a portion such as a flange seated within the opening of the bracket. The flange functions to transfer at least some of the weight of the bag or purse to the bracket.

The assembly further includes a rivet that co-joins the bracket, leaf spring and hook. The rivet permits rotational movement of the hook relative to the bracket. Because purses and bags can have arbitrary dimensions and arrangements of straps relative to their respective bag portions, the rotatable hook arrangement better accommodates a full range of bags.

Another assembly in accordance with the invention comprises a generally C-shaped bracket having an opening, and a leaf spring disposed within the generally C-shaped bracket. The leaf spring is arranged to restrict the opening of the C-shaped bracket unless maintained in a flexed state by an external force. A hook depends downwardly from the bracket and is mounted for rotational movement relative to the bracket. The hook engages the bracket from within the opening to transfer at least some of the weight of the bag or purse to the bracket. A rivet co-joins the bracket and the leaf spring.

Yet another assembly in accordance with the invention comprises a generally C-shaped bracket portion having an opening and a leaf spring portion integral with the brace and arranged to restrict the opening of said C-shaped bracket unless maintained in a flexed state by an external force. A hook depends downwardly from the brace and is mounted for rotational movement relative thereto. The hook engages the brace from within the opening. A rivet co-joins the brace and the hook.

These and other features and advantages can be appreciated from the accompanying Drawing Figures and Description of a Preferred Embodiment.

BRIEF DESCRIPTION OF THE DRAWINGS

The drawings form of part of the instant specification and are to be read in conjunction therewith. In the various views, like numerals are used to indicate like parts.

FIG. 3 is a top view of a cover element of the preferred embodiment showing arbitrary indicia thereupon;

FIG. 4 is the top view of FIG. 3, now showing the cover with different indicia;

FIG. 5 is an end view of the cover of FIG. 3;

FIG. 6 illustrates a modified version of the preferred embodiment;

FIG. 7 is a side perspective view of a second preferred embodiment of the invention having a downwardly depending hook supported from the table clamp by a flexible braid or the like; and FIG. 8 is a side perspective view of a third preferred embodiment of the invention having independently rotatable hooks.

DETAILED DESCRIPTION OF A PREFERRED EMBODIMENT

By way of overview and introduction, the present invention provides a support from which purses, handbags, and objects of other design can be readily suspended from the edge of a table. The assembly of the present invention is configured for simple and secure attachment to a table edge, and ready removal therefrom. A variety of table thicknesses can be accommodated, for example, table edge thicknesses from about ¾" to about 1½" which range constitutes the typical edge thickness of most tables used in restaurants. The assembly of the present invention is also specially configured to support a substantial load that may be imposed by a filled purse or bag (e.g., 10 lbs), as will be better appreciated from the discussion of FIGS. 1 and 2 below.

Figure 1:
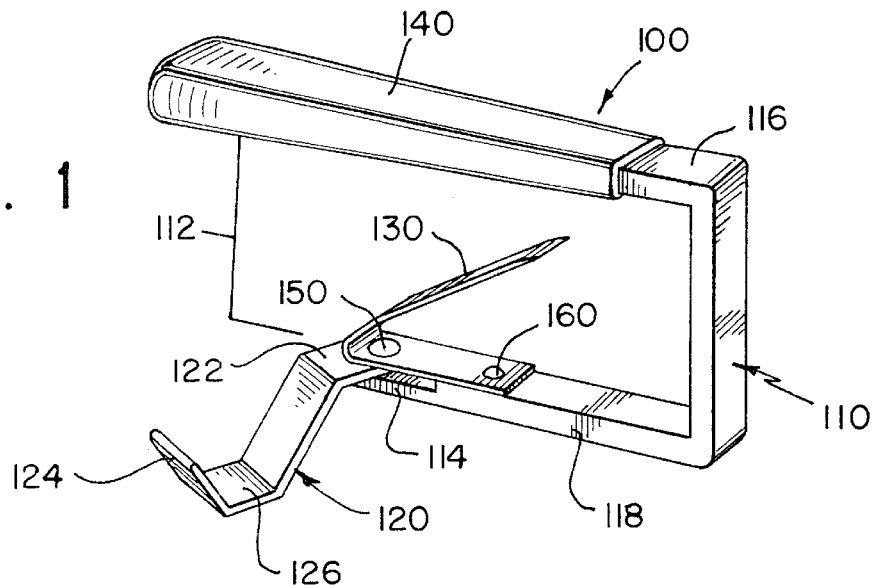
FIG. 1 is a side perspective view of a preferred embodiment of the invention.
Figure 2:
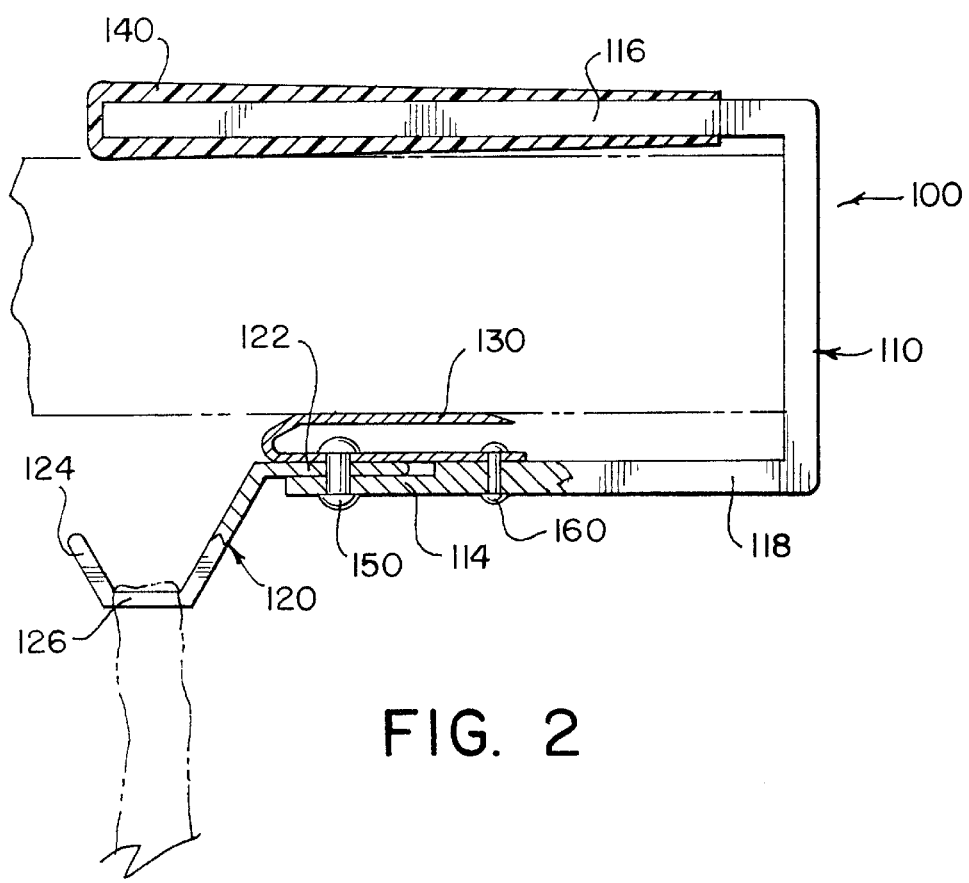
FIG. 2 is a cross-sectional view of the device of FIG. 1, now showing the device engaged with a table edge (in phantom lines) and the hook in a rotated position relative to FIG. 1.

With reference now to FIGS. 1 and 2, the assembly 100 of the preferred embodiment includes six components: a bracket 110, a hook 120, a leaf spring 130, a primary rivet 150 and a secondary rivet 160. The preferred embodiment is also illustrated with an optional cover 140, described below; though the shape and indicia imparted to the cover can be features of the top surface of the bracket itself. The bracket 110 is generally C-shaped and has an opening 112 which is normally closed by the pre-shaped leaf spring 130. The opening 112 is preferably sized so as to accommodate a variety of table edge thicknesses, and is most preferably about 2" high, 4" deep as measured from a top leg 116, and 3" deep as measured from a bottom leg 118.

The leaf spring 130 is arranged to flex into the opening 112 when the assembly 100 is positioned over the edge of a table. Specifically, the leaf-spring 130 has one end secured to the bracket 110 by rivets 150, 160 and a second, free end which cams into a tensioned position in response to the opening 112 being advanced over a table edge (as shown in FIG. 2, the table edge being illustrated in phantom lines). Upon removal of the bracket 110 from the table edge, the leaf spring automatically returns to its pre-shaped and non-tensioned position (as shown in FIG. 1) due to its natural bias. The rivets keep the leaf spring and bracket oriented as shown.

The hook 120 depends downwardly from the bracket 110 and is mounted for rotational movement relative to the bracket about the primary rivet 150. In particular, the hook includes a flange 122, which is seated within the opening of the bracket 110 upon a ledge or shelf 114 thereof. The shelf 114 absorbs a portion of the weight of a bag or purse suspended from the hook by transfer of the gravitational force from the flange to the bracket and then to the table edge. The primary rivet 150 passes downwardly through the leaf-spring 130, the flange 122 of the hook 120, and then the bracket 110 to co-join these elements about the axis of the rivet. The hook further includes an upwardly extending lip 124, which prevents the strap of a purse or other bag from being dislodged inadvertently from a strap seat 126.

The cover 140 is preferably made of a non-skid material such as rubber and certain polymers and plastics. The cover 140 can be comparatively more non-skid than the material selected for the bracket 110 (which can be steel or plastic, for example).

With reference now to FIGS. 3 and 4, two variations of the cover 140 are illustrated. In FIG. 3, the cover includes text indicia that has been printed on or embossed on or molded into the cover. The indicia can identify a particular restaurant, company, or event (e.g., wedding, anniversary). FIG. 4 illustrates decorative indicia such as is included on conventional utensils. It should be understood that in addition to its non-skid properties, the cover 140 can provide promotional and aesthetic benefits to the assembly 100. The cover 140 can be removable from the bracket 110 or affixed permanently by a shrink fit, adhesive, or melting process.

FIG. 5 is an end view of the cover 140, showing an opening 510 that is preferably sized to snugly receive the top leg 116 of the bracket 110.

Regardless of whether a cover 140 is provided, a protective coating can be applied to at least a portion of the bracket 110 (such as the top leg 116) and/or to at least a portion of the hook 120 (such as the lip 124). The protective coating can be a rubber, polymer or plastic coating applied in a variety of ways, such as by a dip, spray or brush coating process. Preferably, the coating comprises a plastic tape having an adhesive on one side thereof, such as manufactured by the 3M Corporation. A coating is preferably provided on the top surface of the leaf spring 130 to protect a table or tablecloth upon engagement, and also on the undersurface of the top portion of the bracket, which is seated upon the table top (see FIG. 1).

Preferably, both the bracket 110 and the hook 120 each have strength sufficient to support about 15 pounds. The bracket and hook are preferably made of the same material (e.g., plastic or steel), though need not be constructed in that way.

As shown in FIG. 6, the bracket 110' can be molded from a plastic together with the leaf-spring 130' to constitute a brace 170 which engages the table edge. In this modified version of the preferred embodiment, the durometer and/or thickness of the brace is controlled to achieve a flexible leaf-spring portion relative to the more rigid bracket portion. The hook 120 is rotatably mounted to the brace 170 by the rivet 150 to complete an assembly 100'. A cover 140 is optionally placed over the top leg 116' of the brace. Alternatively, a protective and/or non-skid coating is optionally applied to some or all of the assembly 100'.

In use, the assembly 100, 100' is slid over the edge of a table by positioning the opening 112 toward the table edge and advancing the assembly about the edge. The assembly is properly seated when it cannot be advanced any further, that is, when the table edge generally abuts the bite of the C-shaped bracket. As the bracket 110, 110' is advanced over and about the table edge, the leaf-spring 130, 130' flexes from its normally biased closed position to an open position which permits the table edge to be received within the opening 112. The natural restoring force of the pre-shaped leaf-spring urges upwardly in an attempt to close the opening 112 while at least partially clamping the assembly in place about the table edge.

The hook 120 can be freely rotated between the positions shown in FIGS. 1 and 2 to accommodate purses and bags of various dimensions. Optionally, washers can be provided about the rivet 150 between the hook and one or more of the other basic elements of the assembly 100 to ease rotation of the hook or to permit the hook to positively stop at one or more prescribed rotational orientations (e.g., by way of complementary protuberances and depressions).

With reference now to FIG. 7, an assembly 200 according to a second preferred embodiment is illustrated. The assembly 200 includes a bracket 210, a hook 220, a leaf spring 230, and a rivet 250 connecting the leaf spring to the bracket. The bracket 210 is generally C-shaped and has an opening 212 that is normally closed by the pre-shaped leaf spring 230.

The hook 220 is coupled to the bracket 210 by a flexible member 270, which preferably comprises a wire braid. The wire braid is threaded through an aperture 272 in the bottom arm of the bracket 210, and is permanently yet movably coupled to the bracket by a knot or protuberance 274. The hook 220 also has an aperture 276 and the wire braid is threaded through that aperture and terminated by a knot or protuberance 278. In use, the hook 220 depends downwardly from the bracket 210 to support the weight of a bag or purse suspended from the hook. The knot or protuberance 274 transfers this weight to the bracket 210 for more reliable support. Upwardly extending lips 224 prevent the strap of a purse or other bag from being dislodged inadvertently from a strap seat 226.

FIG. 8 illustrates an assembly 300 according to a third preferred embodiment. The assembly 300 includes a bracket 310, a hook 320, a leaf spring 330, and a rivet 350 connecting the leaf spring to the bracket. The bracket 310 is generally C-shaped and has an opening 312 that is normally closed by the pre-shaped leaf spring 330. The bottom arm of the bracket 310 includes a bend.360 that positions a shelf 314 further from the top arm 316 and enlarges the opening 312. The bend 360 spaces hooks 320A, 320B downwardly relative to the base of the leaf spring 330 to provide clearance for straps of a bag or purse even after the bracket has been mounted to a table edge. The hooks 320A and 320B each have a flange that is seated upon the surface 314 and the hooks are commonly joined to the bracket by a rivet 370. The surface 314 supports the weight of any bag or purse that is suspended from the hooks, and the rivet 370 permits independent rotation of hook 320A relative to hook 320B. By rotating the hooks 320A, 320B relative to the bracket 310, a variety of bags can be accommodated.

The embodiments of FIGS. 7 and 8 show the leaf spring 230, 330 arranged to flex downwardly and outwardly relative to the top surface 216, 316 of the bracket. This arrangement provides benefits when the bracket is seated over a beveled or contoured table edge. In particular, the free end 232, 332 of the leaf spring is positioned proximate the opening 212, 312 to engage the table further from the table edge, thereby providing a better clamp. In addition, because the leaf spring flexes downwardly and away from the table when the assembly 200, 300 is positioned over a table edge, the restoring force of the leaf spring tends to grip the table and not urge the assembly away from the table edge.

The dimensions of the bracket 210, 310 and the opening 212, 312 can be sized to accommodate a variety of table edge thicknesses, just the same as the embodiment of FIGS. 1 and 2. In addition, the embodiments of FIGS. 7 and 8 can include other features of the embodiment of FIGS. 1 and 2, such as the cover 140, a coating, indicia, and/or a shape imparted to the top surface of the bracket itself. Also, the bracket 210, 310 and the leaf spring 230, 330 can be integral with one another in certain constructions of these embodiments, just as in the embodiment of FIG. 6.

While the present invention has been described with respect to a particularly preferred embodiment, the invention is susceptible to implementation in other ways that are within the spirit of the invention, which is defined in terms of the recitations of the appended claims and equivalents thereof.

I claim:

1. An assembly for suspending a purse from a table edge, comprising:
   a) a generally C-shaped bracket having an opening;
   b) a leaf spring disposed within said generally C-shaped bracket and arranged to restrict the opening of said C-shaped bracket unless maintained in a flexed state by an external force;
   c) a hook depending downwardly from said bracket and mounted for rotational movement relative to said bracket, the hook engaging the bracket from within the opening; and
   d) a rivet co-joining said bracket and leaf spring.

2. The assembly as in claim 1, wherein the hook is coupled to said bracket by a flexible wire braid, the braid being engaged at one end to the hook and at an opposite end within the opening of the C-shaped bracket.

3. The assembly as in claim 1, wherein the hook includes a flange seated within the opening of the C-shaped bracket.

4. The assembly as in claim 3, wherein the flange of the hook is secured to the bracket by a second rivet, and wherein the hook comprises first and second hook members each seated within the opening of the C-shaped bracket and mounted for rotational movement relative to the bracket and independent of one another.

5. The assembly as in claim 1, further comprising one of a protective coating and a cover on at least a portion of the C-shaped bracket.

6. The assembly as in claim 5, further comprising a protective coating on at least a portion of the hook.

7. The assembly as in claim 5, wherein the C-shaped bracket includes the cover and wherein the cover is removable.

8. The assembly as in claim 1, wherein the bracket is substantially rigid as compared to the leaf spring.

9. The assembly as in claim 8, wherein the bracket is constructed of a first preselected material having a strength sufficient to support up to about fifteen pounds.

10. The assembly as in claim 9, wherein the hook is constructed of a second preselected material having a strength sufficient to support up to about fifteen pounds.

11. The assembly as in claim 10, wherein the first and second preselected materials are the same.

12. An assembly for suspending a purse from a table edge, comprising:
   a) a brace including a generally C-shaped bracket portion having an opening and a leaf spring portion integral with said brace and arranged to restrict the opening of said C-shaped bracket unless maintained in a flexed state by an external force;
   b) a hook depending downwardly from said brace and mounted for rotational movement relative thereto, the hook engaging the brace from within the opening; and
   c) a rivet co-joining said brace and said hook.

13. The assembly as in claim 12, further comprising a protective coating at least partially covering the bracket portion of the brace.

14. The assembly as in claim 13, further comprising a protective coating on at least a portion of the hook.

15. The assembly as in claim 12, further comprising a protective coating on at least a portion of the hook.

16. The assembly as in claim 12, further comprising a cover on at least a portion of the brace.

17. The assembly as in claim 16, wherein the cover is removable.

18. The assembly as in claim 12, wherein the bracket is substantially rigid as compared to the leaf spring.

19. The assembly as in claim 18, wherein the bracket is constructed of a first preselected material having a strength sufficient to support up to about fifteen pounds, and wherein the hook is constructed of a second preselected material having a strength sufficient to support up to about fifteen pounds.

20. The assembly as in claim 19, wherein the first and second preselected materials are the same.

* * * * *